United States Patent [19]

Spangler

[11] Patent Number: 5,092,928
[45] Date of Patent: Mar. 3, 1992

[54] PROCESS FOR RECOVERING PAINT OVERSPRAY PARTICLES

[75] Inventor: John M. Spangler, Peoria, Ill.

[73] Assignee: Caterpillar Inc., Peoria, Ill.

[21] Appl. No.: 528,400

[22] Filed: May 25, 1990

[51] Int. Cl.⁵ ............................................. B08B 7/00
[52] U.S. Cl. .................................. 106/287.34; 134/38; 210/703
[58] Field of Search ....................... 106/287.34; 134/38

[56] References Cited

U.S. PATENT DOCUMENTS

| | | |
|---|---|---|
| 2,739,903 | 3/1957 | Arnold . |
| 3,515,575 | 6/1970 | Arnold . |
| 4,151,078 | 4/1979 | Calvin . |
| 4,504,395 | 3/1986 | Harpel et al. .................. 210/712 |
| 4,607,592 | 8/1986 | Richter . |
| 4,629,572 | 12/1986 | Leitz et al. .................. 210/714 |
| 4,637,824 | 1/1987 | Pominville .................. 55/85 |
| 4,699,730 | 10/1987 | Miles et al. .................. 252/181 |
| 4,759,855 | 7/1988 | Kaiser .................. 210/712 |
| 4,853,132 | 8/1989 | Merrell et al. .................. 210/712 |
| 4,861,491 | 8/1989 | Svensson .................. 210/691 |
| 4,863,615 | 9/1989 | Stenger et al. .................. 210/712 |

FOREIGN PATENT DOCUMENTS

WO86/06657 11/1986 PCT Int'l Appl. .
405245 11/1978 Sweden .

OTHER PUBLICATIONS

Derwent's Abstract No. 84-106200/17, published 17th week, 1984, Sorption of Petroleum Product Films from Water-on Hydrophobic Compsn. of Basalt Fibre Contg. Dimethyl-Chloro-Silane.

*Primary Examiner*—Theodore Morris
*Assistant Examiner*—P. L. Hailey
*Attorney, Agent, or Firm*—Robert A. McFall

[57] ABSTRACT

A process for recovering paint overspray particles includes bringing the paint particles into contact with a plurality of hydrophobic fumed silica particles and encapsulating the paint particles within a plurality of the silica particles. The recovered encapsulated particles may be mixed with a suitable solvent, milled and blended with preselected additive materials, to form a desirable reconstituted paint material.

12 Claims, 2 Drawing Sheets

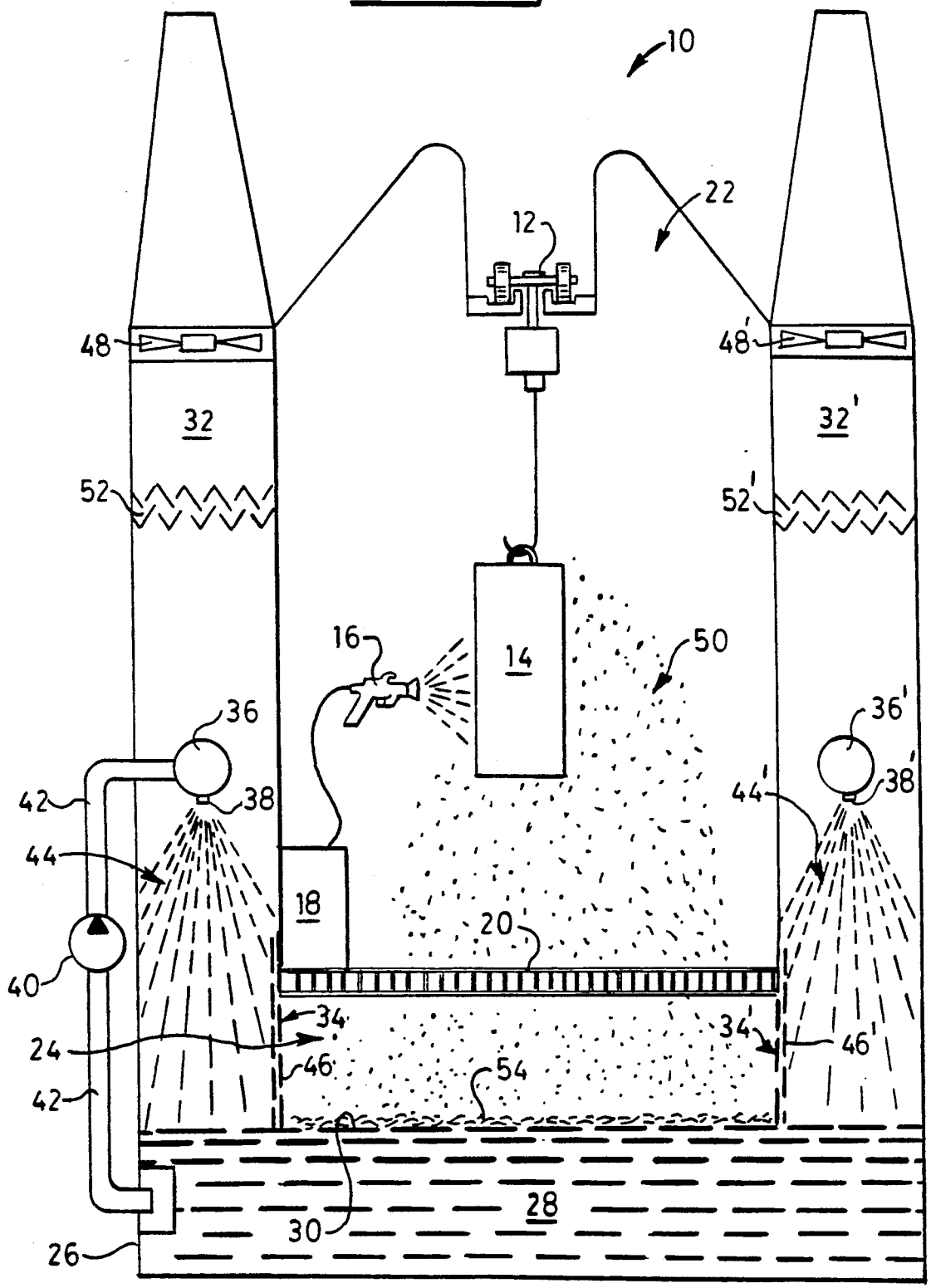

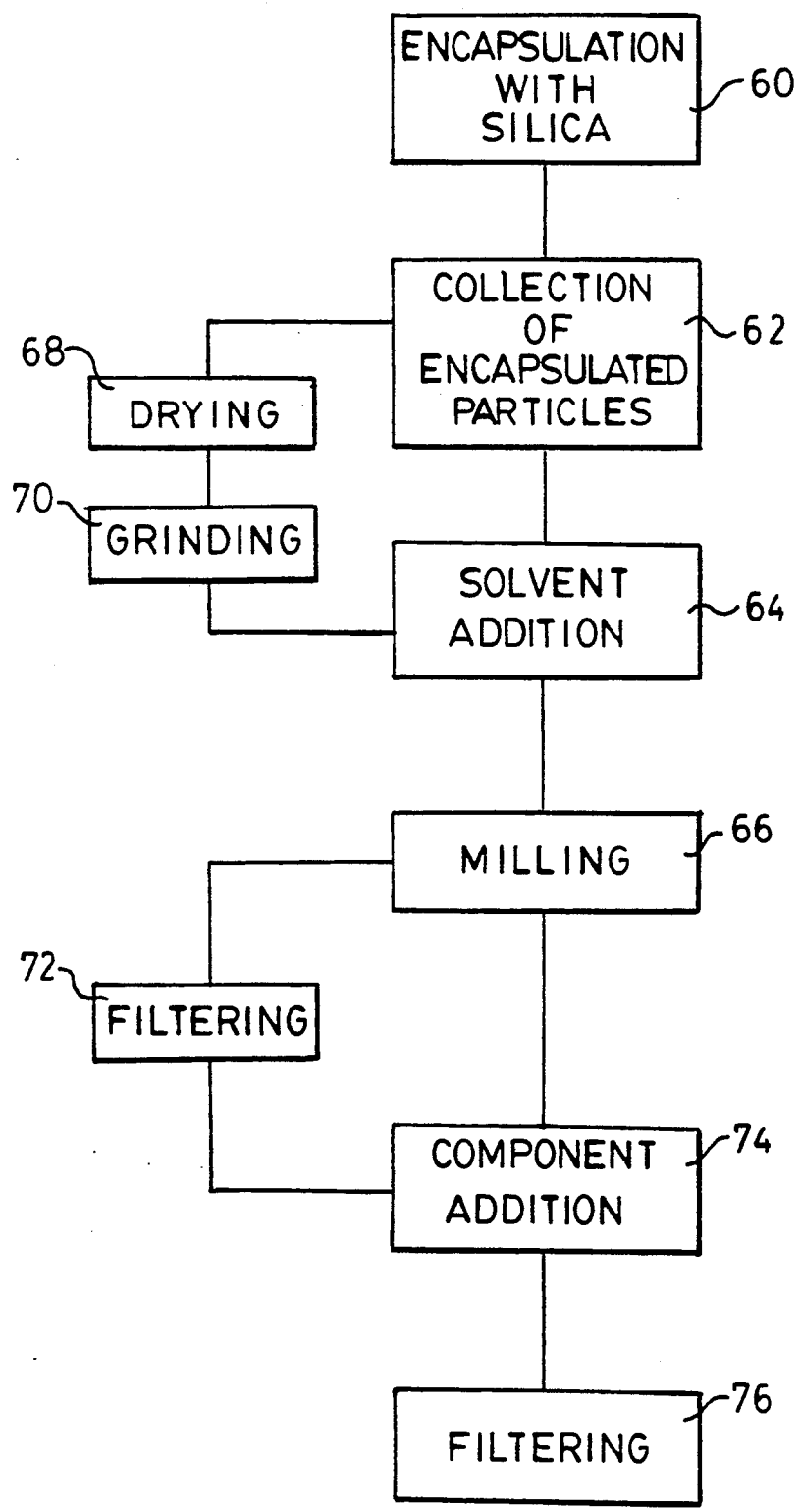

PROCESS FOR RECOVERING PAINT OVERSPRAY PARTICLES

DESCRIPTION

1. Technical Field

This invention relates generally to a process for recovering paint overspray particles, and more particularly to a process for recovering paint overspray particles for reuse as the primary component of a high quality paint product.

2. Background Art

It is becoming increasingly prohibitive, both economically and environmentally, to dispose of paint waste products such as overspray produced by spray painting processes. Therefore, it is desirable to avoid the problem of disposal by recovering and reclaiming paint waste produced during spray painting operations. For example, U.S. Pat. No. 4,607,592, issued Aug. 26, 1986 to Wolfgang Richter, discloses a process for recycling paint overspray. The Richter process requires a particular spray booth arrangement and a special apparatus for recovering and processing the paint overspray. Moreover, since the Richter process does not detackify the paint waste, additional problems are created. In particular, tacky waste products are prone to build up on booth surfaces, special equipment is required to transport and process the tacky waste materials, and the recovered waste must be immediately reprocessed.

Several methods have been proposed for detackifying the paint waste products to permit easier handling and processing. U.S. Pat. 2,739,903, issued Mar. 27, 1956 to Orlan M. Arnold, adds a composition containing sodium tripolyphosphate, anionic and non-ionic surface active agents and other materials to the paint spray booth water. This reference also teaches that finely divided materials such as graphite, bentonite, asbestine and the like have previously been added to the spray booth water. These materials, however, were reported in the reference to be relatively ineffective in detackifying, or deactivating, the various paint materials, and required relatively large additions of such materials to the water in the spray booth before even partial deactivation was obtained.

Another approach to deactivating and collecting paints from a water wash spray booth is described in U.S. Pat. No. 3,515,575, issued June 2, 1970 to Roger F. Arnold. The Arnold process adds water-soluble polyelectrolytes to the water system of the water wash spray booth to disperse paint droplets in the aqueous system. This reference also teaches that compounds containing various alkalis, wetting agents, absorbents, defoamers and the like were dissolved in the water to reduce tackiness of the paint waste product. Examples cited of absorbent materials include talc, chalk, starch, bentonite clay, colloidal silica, calcium silicate, magnesium silicate, aluminum silicate, and montmorillonite clay.

More recently, European Patent Application No. 295,666, assigned to NI Chemicals, Inc. and published on Dec. 21, 1988, describes a method for detackifying paint overspray in which an organophilic clay is used as an agent for separating the organic phase, i.e. paint, from an oil-in-water suspension. Also, U.S. Pat. No. 4,863,615, issued Sept. 5, 1989 to Stenger et al, describes a method for treating the circulating water of a paint booth with a detackifying agent comprising a mixture of a water soluble cationic polymeric coagulant and an aqueous colloidal silica sol.

All of the above processes for detackifying paint overspray are directed toward separating the paint from the wash water, and not to recovering and encapsulating a majority of the paint particles before they become entrained in the wash water. Furthermore, the prior processes undesirably add materials or otherwise condition the waste paint so that it is unsuitable for reuse as the primary component of a high quality paint product.

The present invention is directed to overcoming the problems set forth above. It is desirable to detackify a majority of the paint overspray particles, by encapsulation, before the particles become intermixed with the recirculating wash water in the booth. It is also desirable to have a method for recovering paint overspray that permits recycling of the recovered waste product into a desirable paint product. Still further, it is desirable to have such a method that is readily adaptable to a variety of water wash type spray booths and does not add undesirable materials or compounds to the recovered waste product.

DISCLOSURE OF THE INVENTION

In accordance with one aspect of the present invention, a process for recovering paint overspray particles includes bringing the paint particles into contact with a plurality of hydrophobic fumed silica particles, encapsulating the paint particles within a plurality of the silica particles, and then collecting the encapsulated paint particles.

Other features of the process include depositing a layer of hydrophobic fumed silica particles on at least a portion of the surface of water disposed in a lower portion of a paint spray booth, and directing a flow of the paint particles at a velocity sufficient to bring a majority of said paint particles into contact with the silica particles.

BRIEF DESCRIPTION OF THE DRAWINGS

FIG. 1 is a sectional view of a paint spray booth; and,

FIG. 2 is a flow chart of a process, embodying the present invention, for recovering paint overspray particles.

BEST MODE FOR CARRYING OUT THE INVENTION

A representative paint booth 10 suitable for carrying out a preferred embodiment of the present invention is shown in FIG. 1. The paint booth 10 is a conventional down draft, water wash type paint spray booth having an overhead conveyor 12 for transporting a workpiece 14 through the booth 10. A paint application station is disposed in the booth 10 and includes one or more spray guns 16 connected to a source of paint 18, the operation of which may be controlled by either a robot or human operator.

The paint booth 10 has an open metal grate floor 20 separating the booth into an upper chamber 22 and a lower chamber 24. A water trough, or sump, 26 having a supply of water 28 defining a water surface 30, is disposed in the lower portion, or chamber 24, of the booth 10. Air exhaust ducts 32,32' are positioned at opposed sides of the spray chamber and have an opening 34,34' in their respective interior walls which extends from the floor grate 20 to the water surface 30. The openings 34,34' provide an air flow path between the lower chamber 24 of the booth 10 and the external environment by way of the ducts 32,32'.

Water headers 36,36', having an associated spray nozzle 38,38' mounted thereon, are disposed respectively in the exhaust ducts 32,32'. A supply of pressurized water is directed from the water trough 26 by a pump 40 which pumps water from the water trough to the headers 36,36' by way of a conduit 42, a portion of which is shown in FIG. 1. The spray nozzles 38,38' direct a spray of water into the respective exhaust duct 32,32', forming a spray zone 44,44' within the duct. Also, a portion of the water spray is directed against the interior wall of the duct thereby forming a continuous curtain of water 46,46' across the opening 34,34'.

Exhaust fans 48,48' are respectively mounted in the exhaust ducts 32,32' and provide for the movement of air from the interior of the booth 10 to the external environment. More specifically, air carrying paint overspray particles 50 is directed from the upper chamber 22 of the booth 10, through, or past, the open metal grate floor 20. After passing through the floor grate 20, the air stream containing the overspray paint particles 50 turns and flows through the lower chamber 24 of the paint booth 10 along a path that is substantially parallel to the water surface 30, and then through one of the water curtains 46,46' and the water spray zone 44,44'. The water-washed air stream is then drawn upwardly through respective baffles 52,52' and the exhaust fans 48,48', and then discharged into the external environment.

It is desirable that the velocity of the air stream carrying the overspray paint particles 50 be sufficiently low to permit a majority of the paint particles 50 to fall from the air stream and onto the water surface 30. The optimum velocity at which the oversprayed paint particles will most effectively gravitationally separate from the air stream is a function of the mass and size of the oversprayed particle, and can be determined empirically, by observation.

In the preferred embodiment of the present invention, a layer of hydrophobic fumed silica particles 54 having a particle size of about 16 nm and a BET (Brunauer, Emmett, Teller) surface area of about 110 m$^2$/g, is formed on the surface 30 of the water 28. Hydrophobic fumed silica having these characteristics is commercially available from Degussa AG, Frankfurt, W. Germany, under the trade name Aerosil® R972. It has been discovered that when individual, or a small number of joined, paint particles 50 are brought into contact with hydrophobic fumed silica particles 54 having the above characteristics, the much smaller silica particles 54 become attached to the surface of the larger paint particles 50 and effectively cover, or encapsulate the paint particles. The encapsulated paint particles are not tacky, have a tendency to agglomerate, and are easy to collect and handle by conventional mechanical means.

The layer of silica particles 54 is preferably formed by depositing bulk silica directly onto the water surface 30. Because of its low density, about 50 g/l (3 lbs/ft$^3$), the hydrophobic fumed silica particles 54 float on the water surface 30. Further, because the particles 54 are hydrophobic, i.e. are not readily wettable by water, they remain on the surface 30 of the water and do not settle or become intermixed with the water 28 in the trough 26. Still further, because the silica has an amorphous conformation, the particles spread evenly and form a layer having a substantially uniform thickness on the water surface 30.

In a test of the present invention, it was found that 20 kg (44 lbs) of hydrophobic fumed silica was sufficient to provide a beneficial layer of silica particles 54 on a water surface 28 having an area of 53.5 m$^2$ (576 ft$^2$). The silica layer remained effective to encapsulate paint particles, as described below, for a period of 3 weeks. During this time 568 l (150 gal) of solvent based paint was sprayed in the booth, producing about 170 l (45 gal) of overspray. Thus, as demonstrated by this test, 1 kg (2.2 lbs) of hydrophobic fumed silica is sufficient to treat about 8.5 l (2.2 gal) of paint overspray.

The velocity of the air stream, passing over the water surface 28 was about 0.5 m/s (100 ft/min), a velocity sufficient to permit a majority of the airborne particles to fall from the air stream and be deposited either directly onto the layer of silica particles 50 or onto an exposed portion of the water surface 30.

During this test it was observed that, due to circulation currents in the water 28, the layer of silica particles 54 on the water surface 30 tended to move about, or drift, leaving a portion of the water surface 30 uncovered by the silica layer. However, it was found that the circulation currents were sufficient to bring the paint particles 50 initially deposited on the water surface 30 into contact with the layer of silica particles 54, at which time the particles floating on the water surface 30 were encapsulated by the silica particles 54 in the same manner as the paint particles that were initially deposited directly onto the silica layer. Therefore, contact between the paint particles 50 and the silica particles 54, and the resultant encapsulation of the paint particles by the silica particles, may occur either directly or indirectly. Direct contact occurs when the paint particles are carried by the air directly into initial contact with the silica layer, whereas indirect contact occurs after the paint particles 50 have been initially deposited on the water surface 30 and then carried by water currents into contact with the silica particle layer.

In this test, solvent based paint was used to coat the workpiece 14 and the resultant overspray particles were insoluble in water. If water based paint is used, it is desirable to limit the amount of particles initially contacting the water surface 30, and provide direct contact between the airborne paint particles 50 and the silica particles 54. Therefore, flow control baffles which limit, or prevent, movement of the surface deposited silica layer should be provided in the water trough 26 when the overspray is a water based paint product. This will desirably provide complete coverage of the water surface 30 with silica particles 54 and thereby assure that the airborne paint particles 50 will come into initial contact only with the silica particles.

The small portion of airborne paint particles 50 remaining in the air stream after it has passed through the lower chamber 24, are effectively washed from the air stream by the water curtains 46,46' and the spray zones 44,44'. It was observed during the above described test that the air baffles 52,52' remained substantially free of paint material, indicating that the air exhausted through the ducts was essentially free of the oversprayed paint particles 54. Paint particles 50 removed from the air stream by the water curtains 46,46' and the spray zones 44,44' are carried by the downwardly flowing water of the curtain or spray into the water 28 contained in the trough 26. The paint particles 50 then float to the surface 30 and come into contact with, and encapsulated by, the layer of silica particles 54 disposed on the water surface 30.

Thus, substantially all of the overspray paint particles 50 are brought, either directly or indirectly, into contact with the layer of silica particles 54 disposed on the water surface 30, whereupon the paint particles 50 become coated, or sealed, by the silica particles 54, forming a silica encapsulated paint particle. The initial encapsulation step in the paint overspray particle recovery process embodying the present invention is represented by the block 60 in FIG. 2.

After encapsulation, the silica encapsulated paint particles are collected for processing into a high quality reusable paint product. Most importantly, the hydrophobic fumed silica particles are not deleterious to a paint formed of the encapsulated particles. Silica is an effective additive to paint compositions, and is typically added as a thixotropic agent in decorative coatings, or added to improve the suspension behavior of pigments and the corrosion protection characteristics of primer and industrial coatings.

The collection, represented by block 62, may be carried out by conventional mechanical means. As described above, the encapsulated particles tend to agglomerate and form a cohesive mass. It was observed that the encapsulated solvent base paint particles produced in the above described tests typically remain buoyant for about one week, during which time they could be easily removed from the water through 26 by skimming. If the encapsulated paint particles are not removed while still on the water surface 30, they may be easily removed at a later time from the bottom of the water through 26 by mechanical means.

A suitable solvent is added to the collected agglomerated silica encapsulated paint particles, as indicated at block 64, to enable the formation of a flowable homogeneous mixture comprising the silica encapsulated paint particles and the solvent. The solvent acts to condition the agglomerated particles and aid in a subsequent milling process represented by block 66. In a test, about 36 kg (80 lbs) lbs of silica encapsulated, solvent base, paint overspray particles were collected manually from the water trough 26. About 49 l (13 gal) of xylene, a solvent, was added to the agglomerated particles prior to milling in a ball mill for about 12 h to form an homogeneous dispersion having a solid phase comprising the silica particles 54 and pulverized insoluble components of the paint particles 50, and a liquid phase comprising the solvent and soluble components of the paint particles 50.

Optionally, as an aid to refining the agglomerated particles, the collected product may be dried and ground, as indicated at blocks 68 and 70, prior to the solvent addition step 64. Also, the homogeneous dispersion of paint, silica and solvent may be filtered, as indicated at block 72, prior to adding preselected components, such as binders and solvents (vehicle), solvents, pigments or other additives such as plasticizers, stabilizers, and flow control agents, as indicated at block 74.

The specific component materials added in this step are selected to restore components lost during spraying and the subsequent reclamation process, or to provide a different paint product than that which was originally applied to the workpiece 14. The blending of paint formulas is a well known art and the appropriate additive components, which are dependent on the originally sprayed paint material, are readily determined. In the above described test, about 50 g of alkyd resin, 35 g of an anti-corrosion agent, and 20 g of lamp black/pigment dispersed in xylene, were added to the milled dispersion of paint, silica and solvent. Additionally, MIBK (methyl-isobutyl ketone) was added to reduce the viscosity of the reconstituted paint mixture to provide a viscosity of 25-30 seconds (Zahn #2).

If desired, the blended paint product, including the added components, may be filtered as indicated by block 76, prior to containerization or reuse.

Industrial Applicability

The reconstituted paint material produced in the above described test was applied to two test panels which were then tested in accordance with ASTM standards, as indicated below, to determine the quality of the reconstituted material. The results of this test are as follows:

| Measured Parameter | Value | ASTM Standard |
| --- | --- | --- |
| Salt Fog - (at scribe) | 10 | D 1654 |
| Salt Fog - (unscribed) | 10 | D 1654 |
| Pencil Hardness | F | D 3363 |
| Adhesion | 4B | D 3359 |

Thus, a reconstituted paint having excellent resistance to corrosion, very good hardness and good adhesion characteristics was produced using the silica encapsulated paint particles as the base, or primary, component of the reconstituted paint material.

A significant advantage of the present invention is the ability to reclaim the recovered paint particles and use the recovered product as the base component for high quality paint material. The silica, added to facilitate the separation and collection of the oversprayed particles, is not deleterious to the reconstituted paint material. Further, because the oversprayed paint particles are reused, the problem of sludge disposal is avoided.

Other aspects, objects and advantages of this invention can be obtained from a study of the drawings, the disclosure, and the appended claims.

I claim:

1. A process for recovering paint overspray particles produced in a paint booth having water disposed in a lower portion of said booth, said water defining a water surface, comprising:
   depositing hydrophobic fumed silica particles on said defined water surface and thereby forming a layer of said silica particles on at least a portion of the water surface;
   directing a flow of said paint overspray particles along a path substantially parallel to said water surface at a velocity sufficient to bring a majority of said paint particles into contact with said silica particles;
   encapsulating said paint particles within a plurality of said hydrophobic fumed silica particles; and,
   collecting said silica encapsulated paint particles.

2. A process for recovering paint overspray particles, as set forth in claim 1, including mixing said silica encapsulated paint particles with a solvent and forming a flowable mixture comprising said silica encapsulated paint particles and said solvent.

3. A process for recovering paint overspray particles, as set forth in claim 2, including milling said mixture of silica encapsulated paint particles and solvent and forming an homogeneous dispersion having a solid phase comprising silica particles and pulverized insoluble components of said paint particles, and a liquid phase comprising said solvent and soluble components of said paint particles.

4. A process for recovering paint overspray particles, as set forth in claim 3, including the step of filtering said homogeneous dispersion.

5. A process for recovering paint overspray particles, as set forth in claim 3, including adding at least one additional material and forming a reconstituted paint material.

6. A process for recovering paint overspray particles, as set forth in claim 5, including the step of filtering said reconstituted paint material.

7. A process for recovering paint overspray particles produced in a paint booth having water disposed in a lower portion of said booth, said water defining a water surface, and a water curtain interposed said booth and an environment external to said booth, said water curtain being in fluid communication with said water disposed in the lower portion of the booth, comprising:

depositing hydrophobic fumed silica particles on said defined water surface and thereby forming a layer of said silica particles on at least a portion of the water surface;

directing a flow of air containing at least a portion of said airborne paint particles through said water curtain;

separating, in said water curtain, said portion of airborne paint particles from the air;

carrying said separated paint particles to said defined water surface;

containing said separated paint particles with a plurality of silica particles on said water surface;

encapsulating said paint particles within a plurality of said hydrophobic fumed silica particles; and, collecting said silica encapsulated paint particles.

8. A process for recovering paint overspray particles, as set forth in claim 7, including mixing said silica encapsulated paint particles with a solvent and forming a flowable mixture comprising said silica encapsulated paint particles and said solvent.

9. A process for recovering paint overspray particles, as set forth in claim 8, including milling said mixture of silica encapsulated paint particles and solvent and forming an homogeneous dispersion having a solid phase comprising silica particles and pulverized insoluble components of said paint particles, and a liquid phase comprising said solvent and soluble components of said paint particles.

10. A process for recovering paint overspray particles, as set forth in claim 9, including the step of filtering said homogeneous dispersion.

11. A process for recovering paint overspray particles, as set forth in claim 9, including adding at least one additional material and forming a reconstituted paint material.

12. A process for recovering paint overspray particles, as set forth in claim 11, including the step of filtering said reconstituted paint material.

* * * * *

UNITED STATES PATENT AND TRADEMARK OFFICE
CERTIFICATE OF CORRECTION

PATENT NO.   : 5,092,928
DATED        : March 3, 1992
INVENTOR(S)  : John M. Spangler It is certified that error appears in the above-identified patent and that said Letters Patent is hereby corrected as shown below:

Claim 7, column 8, line 3, "containing" should be --contacting--.

Signed and Sealed this

Twenty-second Day of June, 1993

Attest:

MICHAEL K. KIRK

*Attesting Officer*   Acting Commissioner of Patents and Trademarks